United States Patent [19]

Feller

[11] Patent Number: 4,996,883
[45] Date of Patent: Mar. 5, 1991

[54] ORBITAL-ELEMENT FLOW SENSORS

[75] Inventor: Murray F. Feller, Dunnellon, Fla.

[73] Assignee: Onicon Incorporated, Clearwater, Fla.

[21] Appl. No.: 409,633

[22] Filed: Sep. 19, 1989

[51] Int. Cl.$^5$ .......................... G01F 1/05; G01F 1/20
[52] U.S. Cl. .................................................. 73/861.33
[58] Field of Search ........... 73/861.05, 861.32, 861.33, 73/861.35, 861.79

[56] References Cited

U.S. PATENT DOCUMENTS

| 3,443,432 | 5/1969 | Shonin et al. | 73/861.32 |
| 4,581,743 | 4/1986 | Feller | 73/861.05 |
| 4,890,499 | 1/1990 | Feller | 73/861.05 |

FOREIGN PATENT DOCUMENTS 0153125 9/1984 Japan .................................. 73/861.05

Primary Examiner—Herbert Goldstein

[57] ABSTRACT

An apparatus provides flow-representing signals in response to orbiting of a body which passes a sensor and moves along a circular orbit around the flow path, the orbiting body being supported by a spindle that slants relative to the axis of the flow path.

31 Claims, 3 Drawing Sheets

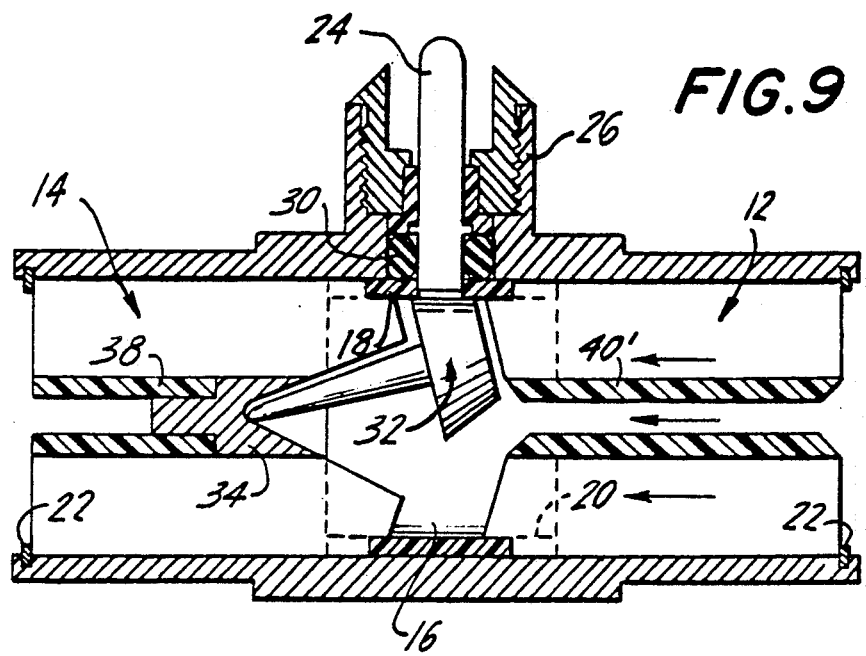
FIG. 9
FIG. 13
FIG. 14
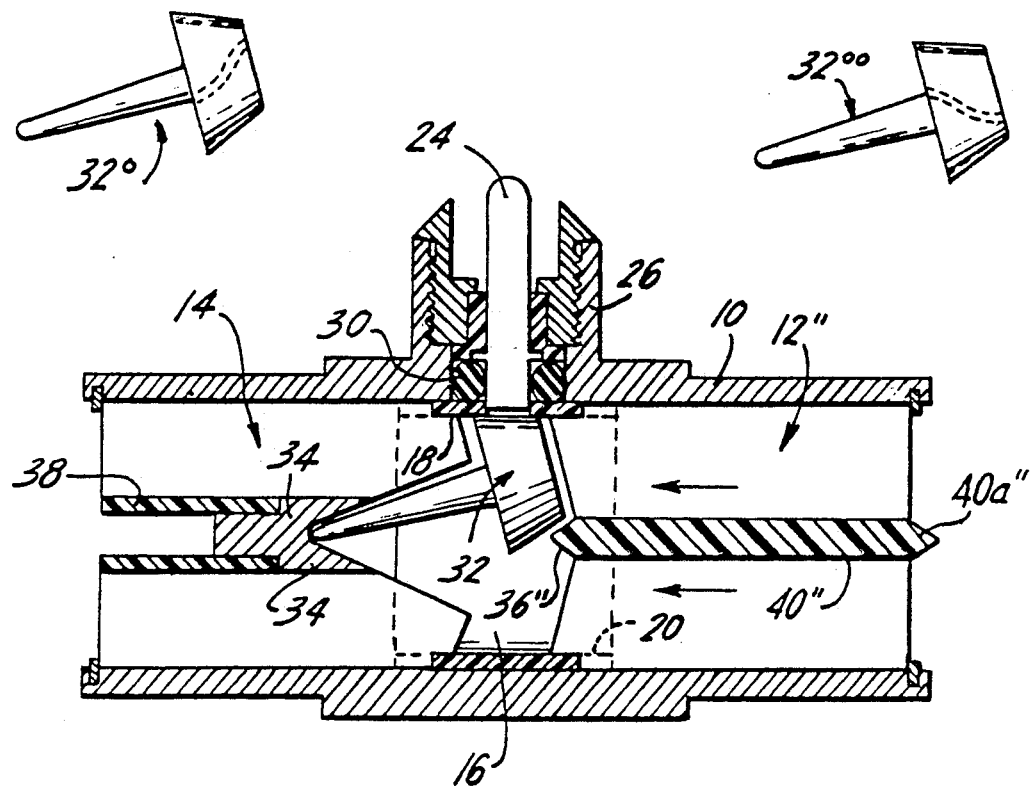
FIG. 10

ORBITAL-ELEMENT FLOW SENSORS

The present invention relates to flow sensors which provide signals representing the flow of fluid in a passage, especially flowing liquid.

A type of flow sensor is known, characteristically having a ball that is induced to orbit around the axis of a flow passage by component of flow that slants across the orbital zone relative to the flow path along the passage. That type of flow sensor has many attractive properties. It is of simple, non-critical construction. It is responsive to a wide range of flow rates; and the orbital ball can be made of materials that are relatively inert, chemically, for use with a wide variety of fluids. The orbiting ball travels past a sensor, doing so in a manner that tends to keep the sensor clear of foreign material that could otherwise accumulate and impair the sensitivity of the apparatus. Various sensors may be used, for example photoelectric detectors, as in my U.S. Pat. No. 4,612,806, and electrical electrodes as in my U.S. Pat. Nos. 4,581,943, 4,790,195 and 4,829,833, and other forms of sensors have been used.

Where a bare or an insulation-covered electrode or its equivalent is used as the sensor, it is placed at or close to the orbital track; the ball is closely coupled to the electrode in rolling along the track without dependence on critical dimensions of parts, as is true of other forms of flow detectors.

In such orbital-ball flow detectors, the ball and the tracks tend to wear out, limiting the useful life of the detectors. The ball orbits against an outer track (commonly part of the fluid-passage wall), and against a coaxial inner track, commonly a conical surface. The ball's engagement with its tracks is partly rolling-contact and partly a twisting motion about each momentary point of contact. The frictional aspect of that character of operation evidently underlies the progressive wearing of the ball and the inner and outer tracks.

The present invention provides a novel orbital flow detector that retains the attractive properties of orbital-ball flow detectors yet wear of the orbiting element is considerably reduced.

The ball in an orbital ball flow detector may occupy an appreciable part of the flow passage's cross-section. The ball's "barrier" effect of constricting the flow passage represents on factor causing some drop of pressure of the fluid in traversing the orbital zone. The orbital element in one form of the novel flow detectors has a vaned body that induces the element to orbit; it has very little "barrier" effect and therefore the drop in pressure across the orbital zone is nominal. Low pressure-drop is an attractive attribute of flow detectors. Moreover, the low pressure drop signifies reduced wear, due to low pressure of the orbiting element against its bearing points.

The ball of an orbital ball flow detector is replaced in the novel flow detectors by an orbital element or "orbiter" comprising an orbiting body on a spindle having a pivot at one end. The pivot is supported by a bearing located along the axis of the flow passage. The body moves in a circular orbit around the axis of the flow path in the orbital zone. An outer track encircles the axis of the flow passage; the orbiting body bears against and rolls along the outer track in some of the novel flow detectors, while in a distinctive form of novel flow detector the outer track serves only as a limiting guide, the orbiting body moving in its orbit without touching the track over a wide range of flow rates.

In all of the novel flow detectors, described in detail below, a sensor in the form of a single electrode is provided at or close to the path of the orbiting body for producing flow representing signals. Other sensors, known in the art, may replace the electrodes, such as photoelectric, acoustic and magnetic sensors.

In some forms of novel flow detectors in which the orbiting body bears against the outer track, there is a line of contact between the orbiting body and its track, in an arrangement which involves a small amount of rubbing. Such rubbing tends to keep the contacting parts clean. Whatever wear that is caused by the rubbing contact is limited; the amount of rubbing varies from zero at one point along the line of contact, and the length of the line of contact is small. The pressure at the line of contact is relatively light, further limiting the wear. Moreover, the length of the line-of-contact between the orbiting body and the track may be reduced to a ring, correspondingly reducing the amount of rubbing to the vanishing point. It is demonstrated in the detailed description, below, that the body may bear against the track without rubbing, which is thus not an inherent trait of those flow detectors.

It has been found that, in certain designs of the novel flow detectors in which the orbiting body travels along its track, the orbiting body shifts into an orbital path out of contact with the encircling track at some flow rates. The length of the orbital path is shortened a little, resulting in some increase in the resulting flow-representing signals per gallon. So long as there is contact between the orbiting body and the track, there is a very nearly constant ratio of the flow-representing signals for a range of flow rates. The shortening of the orbital path at some flow rates would introduce a calibration error unless corrected. The out-of-contact orbiting condition is explained by considering that a region of low pressure develops in the orbital zone that becomes effective to draw the orbital body toward the axis of the flow path. The development of a low-pressure region affecting the orbiter can be controlled in various ways, detailed below, so as to preclude out-of-contact orbiting that may occur at some flow rates.

A distinctive form of novel flow detector is characterized by the orbiting body traveling in its orbit without bearing against its encircling track over a range of different flow rates. This type of flow detector is particularly advantageous where the wear of contacting parts is of concern, as a factor that limits the operating life of the flow detector. These "out-of-contact" orbital flow detectors can result from either or both of a combination of factors. One is the incidental or deliberate creation of a low-pressure region effective to draw the orbiting body into an out-of-contact orbit. Another factor is the relationship between the specific gravity of a liquid whose flow is to be monitored and the specific gravity of the orbiter. Ordinarily the liquid is water; and by making the orbiter of material(s) whose specific gravity is less than unity, the orbiting body tends to "float" away from its encircling track as it orbits. This is explained in greater detail below.

The novel flow detectors involve a spindle that has a stirring motion at its pivot, tending to avoid accumulating dirt at the pivot. The orbiter utilizes only one pivot and bearing, in contrast to flow detectors that rely on turbine-type rotors that have pivots and bearings at opposite ends of a shaft. The pivot and bearing may be costly in long-life flow detectors, so that use of but one pivot and bearing represents a significant economy. The novel flow detectors are extremely promising with respect to accurate proportionality of the flow signals to the flow, and with respect to long life, and with respect to simplicity and ease of manufacture. They may be used with a wide range of fluids, or they may be adapted for such use. The novel flow detectors have still further attractive properties, some of which are noted in the following detailed description of an illustrative embodiment and some modifications, shown in the accompanying drawings.

Figure 1:
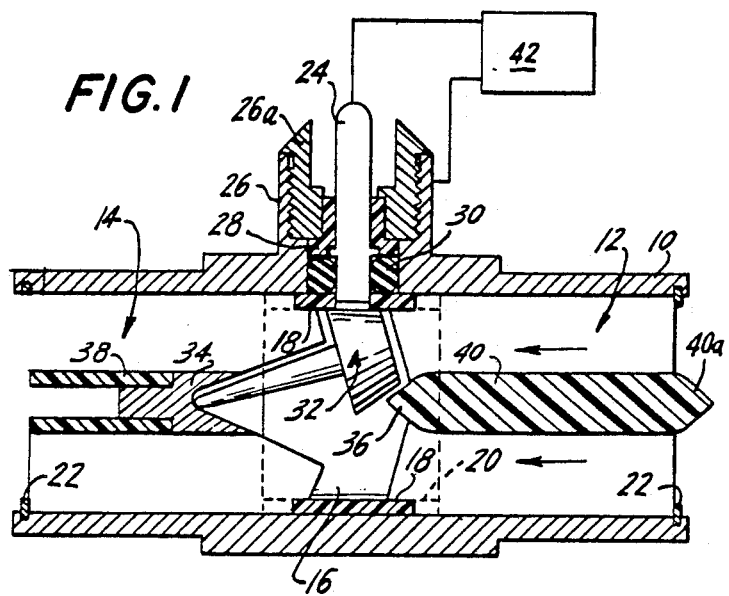
FIG. 1 is a representation of novel flow sensing apparatus including a flow signal generator shown in block-diagram form, and a longitudinal cross-section of a novel illustrative flow-responsive device.
Figure 3:
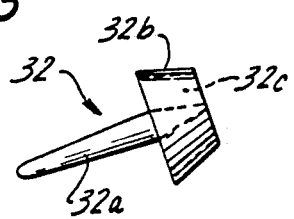
FIG. 3 is a side view of a slant-axis orbital element that is a part of FIG. 1.
Figure 4:
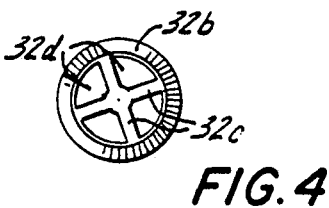
FIG. 4 is a right-hand end view of the orbital element of FIG. 3 perpendicular to its axis.
Figure 5:
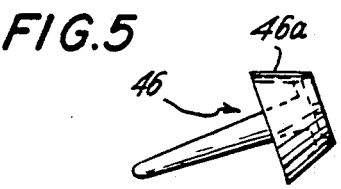
Figure 6:
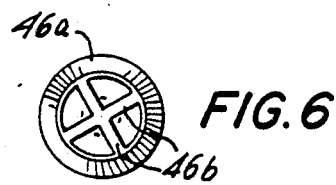
Figure 7:
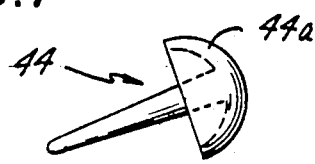
Figure 8:
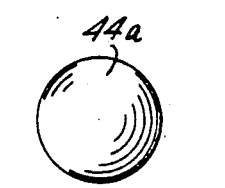
Figure 11:
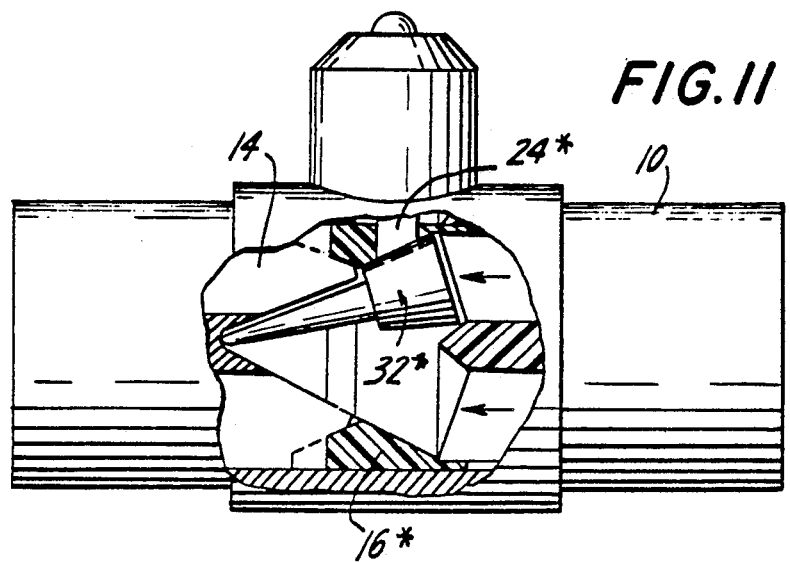
Figure 12:
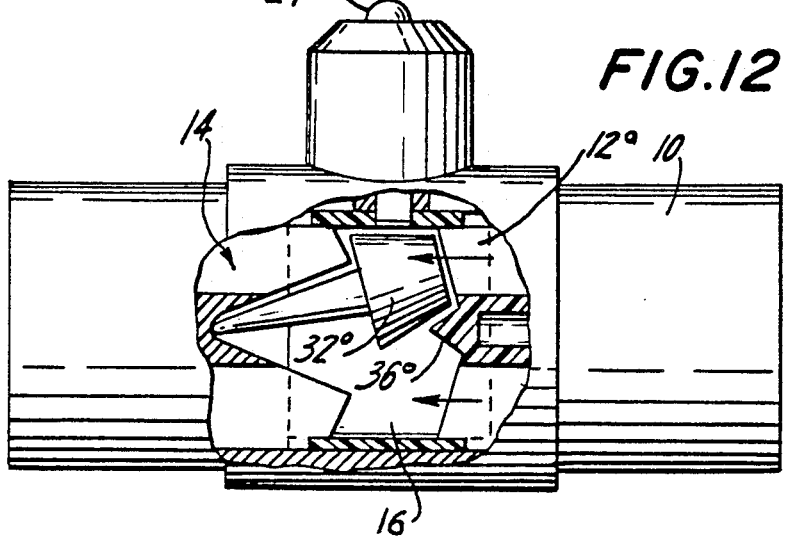
Figure 15:
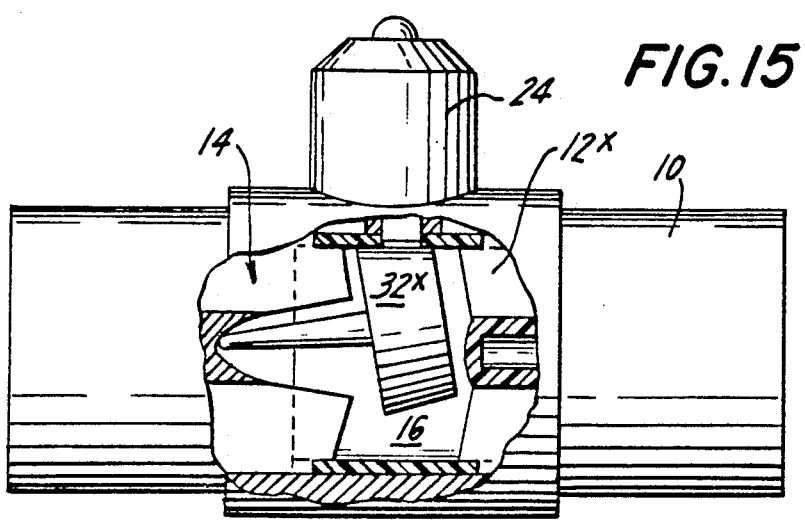

FIGS. 5 and 6 are the side view and the right-hand end view, respectively, corresponding to FIGS. 3 and 4, of an alternative to the slant-axis orbital element of FIGS. 3 and 4;

FIGS. 7 and 8 are side and right-hand end views, corresponding to FIGS. 3 and 4, of a further alternative to the slant-axis orbital element of FIGS. 3 and 4;

FIGS. 9 to 12 are longitudinal cross-sections of modifications of the novel flow-responsive device of FIG. 1;

FIGS. 13 and 14 are side views of orbital elements useful as alternatives in the flow-responsive device of FIG. 12; and FIG. 15 is a longitudinal cross-section of a modification of the flow-responsive device of FIGS. 1 and 9–12.

An illustrative embodiment of the novel flow-sensing apparatus is shown in FIGS. 1–4. In FIG. 1, a short length of pipe or generally cylindrical wall 10 defines a fluid-flow passage. An inlet or upstream unitary assembly of vanes 12 (six vanes in this example) provides a controlled pattern of fluid flow, in the direction indicated by the straight-line arrows in FIG. 1, and a second unitary set of vanes 14 provides further control of the flow pattern in the orbital zone between the sets of vanes.

A thin band or short tube of insulation 16 lines wall 10 Each vane has a notch 18 that receives band 16; and the band, in turn, has a notch 20 that receives each vane. Retainer rings 22 in grooves in wall 10 at the ends of vane assemblies 12 and 14 act to prevent the end-to-end assembled parts 12, 14 and 16 from shifting along the wall 10.

A sensor 24, being an electrode in FIG. 1, extends through wall 10; the inner end of this electrode has a close fit in a hole in band 16. This relationship of electrode 24 and band 16 arrests the band and the vane assemblies 12 and 14 against shifting around the axis of wall 10. Electrode 24 is the inner terminal of a standardized two-terminal connector whose outer terminal 26 extends from wall 10, unified with that wall. Conveniently, the outer terminal 26 is fitted to wall 10 and soldered in place. The connector includes a male threaded fitting 26a within a female-threaded portion of the outer terminal; and an insulator 28 centers electrode 24 and provides electrical insulation between the terminals of the connector. An O-ring 30 around electrode 24 represents supplementary insulation between the electrode 24 and the pipe or wall 10 which is of metal in the form shown. The O-ring providing a seal against leakage.

An orbital element 32 (FIGS. 1 and 3) has a spindle 32a and a body comprising rim 32b and vanes 32c (FIGS. 3 and 4) that extend from the spindle to the rim. The rim is a truncated cone, supported by the vanes on spindle 32a, the spindle and the rim being coaxial. As seen in FIG. 4, the body of element 32 has openings 32d between the vanes, providing fluid passages through the orbital element.

One end of spindle 32a is a pivot that is supported by bearing 34 along the axis of wall 10. Spindle 32a extends at a small acute angle to that axis. When there is a flow of fluid in the direction of the straight arrows in FIG. 1, rim 32b bears against the inner surface of band 16. Conical support 36 keeps the orbital element in approximately the same position as that which is shown in FIG. 1 when there is no flowing fluid. Support 36 provides assurance of the orbital element being in position for element 32 to operate as described when the fluid starts to flow. Bearing 34 is assembled to a core 38 which unifies the vanes of vane assembly 14, and support 36 is part of the core 40 that unifies the vanes of vane assembly 12.

The vanes of assembly 12 in one form of the apparatus of FIGS. 1–4 have a spiral curvature or twist extending end-to-end such as to produce a swirling flow pattern in the zone within band 16, i.e., the downstream ends or edges of the vanes 12 are indexed by a small angle around the axis of wall 10, in relation to the inlet edges of those vanes, respectively. Vanes 14 also have the same twist. The resulting flow pattern induces element 32 to orbit about the axis of wall 10. The vanes 32c of the orbital element also have a spiral twist along their lengths, so as to provide enhanced coupling of the orbital element to the flowing fluid. Due to the twist of vanes 32c, the flowing fluid induces orbital element 32 to rotate about its spindle axis, supplementing the effect of the swirling flow pattern that causes element 32 to orbit and to rotate about its spindle axis, as it rolls along the orbital track provided by band 16. When vanes 12 twist clockwise between the flow-entry ends of the vanes and their flow-exit ends, the twist of the vanes 32 is counterclockwise.

In an alternative configuration, vanes 12 and 14 are simple flow-straightening vanes. Element 32 has vanes that are spiralled or twisted along and around the spindle axis. The reaction of the vanes 32c to the flowing fluid causes element 32 to rotate about its spindle axis; and because element 32 is caused to bear against band 16, rim 32b of the vaned body 32b–32c rolls on band 16, driving element 32 in orbit about the flow axis.

The flowing fluid to be monitored may be tap water, which is slightly conductive electrically. A signal generator 42 applies a potential between electrode 34 and metal wall 10, creating a conduction pattern in the water. Element 32 is a molded plastic having a much higher resistivity than that of tap water. As rim 32b traverses electrode 24, there is an abrupt increase in resistance between sensing electrode 24 and wall 10 that forms the return-electrode of the current path in the flow passage. Accordingly, a periodic flow-representing signal is developed in signal generator 42.

In the illustrated form of the apparatus, electrode 24 has a bare end that is exposed to the flow passage, and it is slightly recessed from the bearing surface of band 16 along which rim 32b rolls. The end of electrode 24 produces a field pattern extending to return electrode 10 during most of the orbital travel of element 32 When traversing the end of electrode 24, rim 32b acts as a shroud, largely suppressing that field pattern. The form of signal produced by the illustrative structure changes somewhat in an alternative in which the surface of electrode 24 is flush with the track surface along which element 32 rolls.

Rim 32b does not encounter a bump in its track in passing recessed electrode 24, inasmuch as rim 32b bears against portions of band 16 around the hole where electrode 24 is exposed.

The circuit of signal generator 42 may be any of various forms, from the elemental form shown and described in my U.S. Pat. No. 4,790,195, to more elaborate circuits, as shown and described in my U.S. Pat. No. 4,829,833. A continuous band that provides a thin layer of insulation may be used instead of band 16; and wall 10 may be of insulation, using a suitable return electrode, for example a film of metal deposited on a pipe made of insulation as shown and described in my U.S. Pat. No. 4,581,943. The dielectric property of orbital element 32 as well as its resistivity, and its electrical loss property (which may be enhanced by using a conductive filler) are factors utilized in various signal generators. Accordingly, by using appropriate circuits and using various materials for element 32 (as may be appropriate), the apparatus may be used with a wide variety of liquids, and even with air or other gases. Where electrode 24 is covered by insulation and the wall 10 is of insulation, the materials used may be selected for their non-reactive properties with potentially corrosive liquids. And while electrodes are preferred for sensing the orbiting of element 32, photoelectric, acoustic and other detectors may be utilized as contemplated alternatives, disclosed in my U.S. Pat. Nos. 4,462,264 and 4,829,833. The circuits and related disclosure in all my patents noted above are incorporated by reference, rather than to set forth all of that detail here.

Figure 2:
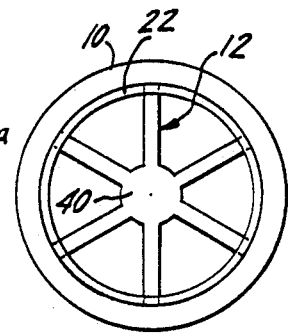
FIG. 2 is a view of the right-hand end of the device in FIG. 1.

The apparatus of FIGS. 1 and 2 may be used with alternative forms of orbiting elements, for example those of FIGS. 5 and 6 or of FIGS. 7 and 8. In FIGS. 7 and 8, the orbiting element 44 has a largely hollow hemispherical body 44a on its spindle. Used in the flow-sensing device otherwise as in FIGS. 1 and 2, in which vanes 12 and 14 are twisted so as to produce a swirling flow pattern in the orbiting zone, element 44 may be used as a substitute for element 32. A portion of body 44a serves as a rim that rolls on band 16, and the track along which that rim rolls may be slightly displaced axially from electrode 24 if that electrode is not flush with band 16.

Orbiter 46 is another alternative to orbiter 32 for use in the apparatus of FIGS. 1 and 2. Orbiter 46 has a truncated-cone body 46a that provides a wide rim to roll on band 16. Body 46a has a closed wall across its end, having recesses outlined by ridges 46b. These formations 46b and others may be used for increased coupling between the flowing fluid and the orbiter that is driven by that fluid.

Orbiter 32, 44 and 46 operate in a manner such that the device tends to remain clear of foreign materials in the fluid. The spindle acts as a stirrer in its bearing, and the rim of the orbiter rolls with a small degree of twisting contact against band 16. These two effects tend to maintain the device in stable operation by keeping the bearing areas clean.

Compared to the twisting regions of contact of an orbital ball against its companion inner and outer tracks where rubbing occurs, rim 32b and the rims of the alternatives have markedly reduced rubbing, hence a reduced rate of wear of the orbiter and the track. The small slant angle of the spindle signifies reduced pressure of the rim against band 16, further contributing to reduced wear.

A factor that is related directly to wearing of the track and the orbiter is the pressure developed by the fluid against the orbital body. The openings 32d in element 32 reduce the pressure developed by the fluid against the orbital body, reducing the pressure and wear at rim 32b and at the spindle's-pivot.

Orbiters 32, 44 and 46, largely hollow and of molded insulation, can have near-neutral buoyancy in liquids whose flow is to be monitored. However, when true neutral buoyancy is not achieved rigorously and low flow rates are encountered, the effect of buoyancy can be mitigated by disposing the axis of the flow passage vertical, choosing the flow direction and the orbiter's position relative to its buoyancy to bias the pivot into its bearing.

Referring to FIG. 1, the diameter of core 40 is large enough to facilitate molding of the unitary assembly of vanes 12. Especially where vanes 12 are spiralled, providing a thick core makes the assembly easy to mold. If the upstream end of core 40 were flat, it would increase the pressure-drop of the device. Core end 40a is bullet-shaped or streamlined, largely avoiding that increased pressure-drop. If the support 36 were omitted, and if the downstream end of core 40 were a flat transverse surface, a low-pressure space would develop in the flow path that would tend to draw the body 32b–32c toward the flow axis and away from its orbital track. This effect is pronounced for the proportions shown, the diameter of body 32b–32c being approximately half the diameter of the flow passage. Making the down-stream end 36 of core 40 streamlined, a bullet shape, essentially avoids creation of such low-pressure space. While core 40 might appear to be unnecessarily bulky, its thickness is reasonable. The whole device of FIG. 1 is actually an enlarged representation, to scale, of an actual device whose passage diameter is approximately ¾-inch, and the diameter of the core is only about 3/16-inch.

The apparatus of FIG. 1 having the form of orbiter shown in FIGS. 3 and 4 is proportioned so that orbiter 32 maintains contact with its outer track (band 16) in its orbital motion throughout its useful range of flow rates. That mode of operation is attained as a result of several factors.

The swirling liquid pattern in the orbital zone, as developed by the upstream vane assembly 12, produces centrifugal forces on the liquid itself and on the orbiter. Those forces bias the liquid and the orbiter outward, toward the outer track, band 16. The force that biases the orbiter outward will be greater than the force that biases the liquid outward if the orbiter's specific gravity is greater than that of the liquid. This is analogous to the everyday static system involving a liquid and a solid where gravity is the controlling force. If the density of the solid is greater than that of the liquid, the solid will sink; otherwise, it will float. By analogy, the body of the orbiter will bear against the band 16 (disregarding other factors) if its density is greater than that of the liquid. If the density of the orbital body is less than that of the liquid (so that it would float in the everyday static system) the orbital body would tend to remain spaced from the track.

Another factor that influences the bearing of the orbiter against its track, band 16, is the development or non-development of a region of significantly reduced pressure or "vacuum" downstream of the hub 40 of vane assembly 12. As already noted, such a reduced-pressure region in the orbital zone has a tendency of drawing the orbiter inward, i e., biasing it toward the flow-passage axis. The streamlined downstream end 36 of hub 40 weakens the partial vacuum that would develop with a blunt hub.

Still further, the downstream thrust of the flow impacting against orbiter 32 biases its spindle into bearing 34 and biases the orbiter's body outward, away from the axis and toward band 16. That outward bias depends on many factors in the orbiter's design, notably on its composite upstream-facing area and on how each small portion of that area slants relative to the direction of flow. For example, the net force acting outward on orbiter 32 is higher with a thin rim and vanes than when those parts are thick.

In practice, it is not difficult to proportion the components in such a manner that the orbiter bears against its outer track provided by band 16 throughout a wide range of flow rates. Nonetheless, making the orbiter of material(s) whose density nearly equals that of the fluid helps in maintaining the "contacting" mode of orbiter operation represented in FIG. 1 even at very low flow rates, and when the flow passage is horizontal.

The form of vanes 32c influences the performance characteristics of the flow sensing device of FIG. 1. If that device is viewed from the left of FIG. 1 along the axis and if (in an example) the swirling flow pattern induces clockwise travel of orbiter 32 around the flow axis, the orbiter turns counterclockwise about its spindle due to its bearing against band 16. The orbiter's vanes can have a twist that induces the orbiter to turn at the same rate as when it is rotated by contact with band 16. That twist is roughly three times as steep as the vanes of unit 12, and in the opposite direction. Since the orbiter would then be self-driven, no longer being driven by its frictional contact with its track, reduced wear of the parts may be expected. However, it has been found that an increasing number of signal pulses per gallon develop at low flow rates, deviating from the ideal condition of a constant ratio of pulses per gallon for all flow rates. The vanes of the orbiter can have a lesser twist, or they may be "straight" (coplanar with the spindle axis) or the twist may even be reversed, with excellent performance over a very wide range of flow rates. Moreover, the vanes of assembly 12 can be "straight" (coplanar with the flow axis) so that a straight-through non-swirling flow pattern is produced in the orbiting zone; and then orbiter 32 with spiralled vanes would induce orbiting.

FIGS. 9 to 12 and 15 represent alternative flow-responsive devices. FIGS. 9 to 12 are the same as in FIG. 1 except for modification of the core of the upstream vane assembly. In FIG. 15 both the upstream vane assembly and the orbiter are modified as compared to FIG. 1. The parts in all five Figures that are the same bear the same reference numerals and modified parts bear the same number with distinguishing characters. The above description of the device of FIG. 1 applies to the structure common to FIGS. 1, 9 to 12 and 15.

In FIG. 9, core 40' upstream assembly of vanes 12' is a tube; its bore provides a fluid passage to the space at the downstream end of the core, where a side of body 32b–32c is located. Whereas the core of the vane assembly 12 tends to create a low-pressure region at and near the flow axis which tends to draw any orbiter toward the flow axis and away from the orbital track at band 16, the bore in the core of the upstream vane assembly reduces that effect.

In the alternative of FIG. 10, core 40" of the inlet assembly of vanes 12" is as slender as possible, being no more than the intersection of the vanes of the molded unit. The core ends 36" and 40a" are streamlined even though core 40" in any case is so slender that there should be concern for the effects of a much thicker blunt core as described above.

In the form of flow sensing device represented in FIG. 11, the orbiting body of orbiter 32* has a conical exterior, being a truncated cone whose apex is at the spindle's pivot. The orbiter's conical body may be solid or shaped like orbiter 46 (FIGS. 5 and 6) or it may be vaned, as described above. Insulating sleeve 16* provides a complementary conical track surface. Accordingly, where orbiter 32* has a line contact with track 16* at each point in the orbital path, that contact involves pure rolling action all along the line of contact, without rubbing. That configuration is best suited to achieve minimum wear of the contacting parts. However, the diameter of the flow passage is reduced because of the conical shape of track 16*, so that there would be an increase in the pressure drop in the device as compared to the other devices in which the track provided by band 16 is cylindrical. Moreover, the construction is more complicated, and may not be warranted.

FIG. 12 represents a distinctive form of orbital flow-responsive device, in which the orbiter 32° travels in a circular orbit without contacting insulating band 16 throughout a wide range of flow rates. This operation results from a combination of factors. The hub of upstream vane assembly 12° is deliberately made large, and (unlike FIG. 1) its shape is not streamlined, so that a significant "vacuum" or low-pressure region is created at and near the flow-passage axis in the orbital zone. That condition draws the orbiter toward the flow axis, and out of contact with the insulating band 16. The thrust of the fluid flow against the upstream-facing area of orbiter 32° produces a component of force acting outward on the orbiter; but that force is less than the centering effect of the "vacuum" throughout at wide range of flow rates. The orbiter may be slightly more or less dense than the fluid, without negating that non-contacting characteristic of operation. Wear of the orbiter and its track is eliminated, prolonging the useful life of the device.

If the diameter of the orbit were to increase or decrease substantially, the orbital time interval would change, resulting in a lower or greater number of signal pulses per gallon. At very low flow rates, especially when the detector is installed with its flow axis horizontal, the axis of the orbiter tends to tilt toward the flow axis for part of each orbit due to gravity; and in that condition the length of the orbital path would be reduced so that the signal pulses per gallon would increase above the norm or constant that prevails with little change over a wide range of flow rates when the out-of-contact condition in FIG. 12 is maintained. Track 16 and tip 36° serve as guides that limit reduction of the orbit's length at extreme flow rates. Any contact of the orbiter and its guides under those conditions involves light contact pressure, hence nominal wear of the parts.

Factors other than the density of the material of the orbiter are more controlling and, as a result, the kind of "non-contacting" operation represented in FIG. 12 is realized even when the flowing fluid is air. However, for best operation over a wide range of flow rates, the mass and weight of the orbiter should be a minimum, and its density should be near the density of the fluid to be monitored. For flow detectors commonly used with water, the specific gravity of the orbiter should be close to unity, i.e. neutral buoyancy.

An orbiter in FIG. 12 that is solid (as in FIG. 5) tends to rotate in the same direction as it orbits, as viewed from the left in FIG. 12. Orbiter 32° or 32° ° (FIGS. 13 and 14) with vanes twisting in either direction, or straight, can be used with stator vanes 12 that impart a swirling flow pattern in the orbital zone. The shape of the orbiter's vanes affects the calibration of the device over its range of flow rates. Based on early samples of the device, a range of flow rates of 100:1 is projected, in which the signal pulses per gallon remain constant with only a small percent of deviation over a wide range of flow rates.

Two kinds of orbital flow-responsive apparatus are described above, a "contacting" type as in FIGS. 1 and 9–11, and a "non-contacting" type as in FIG. 12. Both kinds of apparatus are easily produced by varying the design of the orbiter and the flow pattern in the orbital zone. For example, even though hollow hub 40' is used in the "contacting" type of apparatus, that hollow hub can be used in a "non-contacting" type of apparatus by altering the design of the orbiter in various ways, as by shaping the orbiter to have increased coupling to the low-pressure region near the flow axis, and by reducing the area of the orbiter that is impacted by the downstream flow, and some contribution toward the "non-contacting" kind of operation can be obtained by using lower density material in the orbiter.

The bodies of the orbiters in all of the devices thus far considered ar shown as having a mean diameter that is roughly equal to the radius of the flow passage in the region where the orbiting body operates. That proportion has proved to be highly effective. Larger or smaller diameters of the body of the orbiter would be operative. FIG. 15 shows a "contacting" orbiter $32^x$ whose body has a diameter substantially larger than the radius of the flow passage. Increased interaction of the flowing fluid and the orbiter is obtained. However, the smaller diameter orbiters evidently can have ample coupling to the fluid, and they represent a smaller "barrier" in the flow path, thus developing lower drop in the pressure of the fluid between the inlet and the outlet of the device.

It is apparent that the illustrative embodiment of the invention and the variants described above are amenable to further modification so that the invention should be construed broadly in accordance with its true spirit and scope.

What is claimed is:

1. Apparatus for sensing the flow of fluid, including a wall defining a passage along which fluid flows, the passage having an imaginary longitudinal axis, an orbital element having a spindle extending at an angle to said axis and having a pivot at said axis, said orbital element having a fluid-driven body on said spindle, bearing means for said pivot disposed in the passage at said axis, said body being related to the pattern of flow in the passage so that the body is induced by flowing fluid to orbit about said axis, said orbital element being driven by fluid flowing in one direction along the passage so that said pivot is biased against said bearing means and said body travels in a circular orbit, and means including a localized sensor periodically passed by said body as the element orbits for producing a flow-representing signal.

2. Apparatus for sensing fluid flow, including a fluid-passage wall about an imaginary axis, means forming a circular track centered about said axis, support means including a bearing at said axis, an orbiter having a spindle which slants relative to said axis and having a pivot at one end that cooperates with said bearing, said orbiter element having a flow-driven body including a rim that rolls against said track as the element orbits, said body being so related to the pattern of flow that the flowing fluid drives the body orbitally about said axis and biases said rim against said track, and means including a localized sensor at least in proximity to said track for producing flow-representing signals in response to orbiting of said orbiter.

3. Apparatus as in claim 2 wherein said support means further includes means for retaining said orbiter positioned with its pivot at least close to said bearing and with its spindle slanting relative to said axis when the apparatus is not in use.

4. Apparatus as in claim 2 wherein said flow-driven body is largely hollow and is made of a plastic such that the buoyancy of the orbiter is approximately neutral for fluids with which it is to be used.

5. Apparatus as in claim 2 wherein said orbiter has fluid-coupling formations for enhanced response of the orbiter to flowing fluid.

6. Apparatus as in claim 5 wherein said fluid-coupling formations are vanes that afford passages for fluid to flow through said fluid-driven body.

7. Apparatus as in claim 2 wherein vanes are disposed in said passage at least at the side of said flow-driven body remote from said pivot for imparting an orbit-inducing component to the pattern of flow of the fluid past said flow-driven body.

8. Apparatus as in claim 2 wherein vanes are disposed in said passage at least at the side of said flow-driven body remote from said pivot for establishing a flow pattern at said track, and wherein the vanes are spiralled about said axis, for inducing rotation of the orbital element.

9. Apparatus as in claim 2 including an assembly of vanes in said passage for controlling the flow pattern approaching said flow-driven body, said assembly of vanes having a unifying core extending axially in said passage and whose formation avoids development of low pressure at the downstream end of the core such as to draw the orbital body away from said track.

10. Apparatus as in claim 9 wherein said formation of the core comprises a streamlined downstream end thereof.

11. Apparatus as in claim 9 wherein said formation of the core comprises a lengthwise fluid passage therein.

12. Apparatus as in claim 9 wherein said vanes extend radially from the core, and the cross-section of the core is represented essentially by the intersection of the vanes.

13. Apparatus for sensing fluid flow, including a fluid-passage wall about an imaginary axis, the wall providing a circular track centered about said axis, an orbital element having a spindle which slants relative to said axis, support means including a bearing at said axis, one end of the spindle being a pivot that cooperates with said bearing, said orbital element having a flow-driven body including a rim that rolls against said track as the element orbits, said body having vanes for inducing the orbital element to rotate about the axis of its spindle in response to flowing fluid, and means including a localized sensor at least in proximity to said track for producing flow-representing signals in response to orbiting of said element.

14. Apparatus as in claim 13 including flow-straightening vanes in the passage at least in the path of the fluid approaching said track whereby orbiting motion of the orbital element results from fluid-induced pressure of said rim against said track and from rotation of the orbital element due to fluid flowing past its vanes.

15. Apparatus as in claim 13 including spiralled vanes in said passage at least in the path of the fluid approaching the track for producing a swirling pattern of flow in the zone where said body orbits, the swirling flow pattern inducing the orbital element to orbit about said axis with its rim rolling along said track, the effects of the vanes in the passage and the vanes of said body complementing each other in causing fluid-responsive orbiting of the orbital element.

16. Apparatus for sensing the flow of fluid, including a wall defining a fluid guiding passage having an imaginary longitudinal axis, an orbiter in said passage including a spindle disposed at an acute angle to said axis, said orbiter having a pivot at one end of the spindle and an orbital body on the spindle spaced from the pivot, a bearing for supporting the pivot at the axis, the orbital body being disposed in an orbital zone of the flow passage, means for controlling the flow of fluid to produce a swirling flow pattern in the orbital zone so related to said orbital body that said body is induced to travel in a circular orbital path around said axis while remaining in contact only with the fluid over a range of flow rates, and means including a localized sensor at least in proximity to said orbital path for producing flow-representing signals.

17. Apparatus as in claim 16 wherein the density of said orbital body is at least approximately equal to that of the fluid whose flow is to be sensed.

18. Apparatus as in claim 16 wherein said orbital body has vanes responsive to the fluid for at least partially determining rotation of the orbital body around the spindle's axis.

19. Apparatus as in claim 18 wherein the density of said orbital body is at least approximately equal to that of the fluid whose flow is to be sensed.

20. Apparatus as in claim 17 including guide means engageable by the orbital body for limiting the orbital body to travel in orbital paths whose lengths are approximately equal to the length of said circular orbital path at flow rates outside said rang of flow rates.

21. Apparatus as in claim 16 wherein said flow pattern controlling means includes means for developing a region of reduced fluid pressure in the orbital zone that biases the orbital body toward said axis, the orbital body having an area impacted by the flow which biases the orbital body away from the axis, said area being limited in relation to the reduced pressure developed by the reduced pressure developing means for attaining the aforesaid circular orbital path of the orbital body over a range of flow rates.

22. Apparatus as in claim 21 wherein the density of said orbital body is at least approximately equal to that of the fluid whose flow is to be sensed.

23. Apparatus as in claim 21 wherein said orbital body has vanes responsive to the fluid for at least partially determining rotation of the orbital body around the spindle's axis.

24. Apparatus as in claim 23 wherein the density of said orbital body is at least approximately equal to that of the fluid whose flow is to be sensed.

25. Apparatus as in claim 21 including guide means engageable by the orbital body for limiting the orbital body to travel in orbital paths whose lengths are approximately equal to the length of said circular orbital path at flow rates outside said range of flow rates.

26. Apparatus as in claim 25 wherein the density of said orbital body is at least approximately equal to that of the fluid whose flow is to be sensed.

27. Apparatus as in claim 1, wherein the cross-section of said body transverse to its spindle is circular, and the cross-section of said passage transverse to its axis is circular at least in the region where said body orbits, and wherein the mean diameter of said body is roughly equal to the radius of said passage in said region.

28. Apparatus as in claim 1, wherein the cross-section of said body transverse to its spindle is circular, and the cross-section of said passage transverse to its axis is circular at least in the region where said body orbits, and wherein the mean diameter of said body is substantially greater than the radius of said passage in said region.

29. Apparatus as in claim 2, wherein the mean diameter of said rim is roughly equal to the radius of said track.

30. Apparatus as in claim 2, wherein the mean diameter of said rim is substantially greater than the radius of said track.

31. Apparatus as in claim 2, wherein said rim is a truncated cone and has line contact with said track.

* * * * *